(12) United States Patent
Lu et al.

(10) Patent No.: US 11,107,075 B2
(45) Date of Patent: Aug. 31, 2021

(54) BLOCKCHAIN DATA PROCESSING METHODS, APPARATUSES, DEVICES, AND SYSTEMS

(71) Applicant: Advanced New Technologies Co., Ltd., Grand Cayman (KY)

(72) Inventors: Xuming Lu, Hangzhou (CN); Hushen Wang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/408,103

(22) Filed: May 9, 2019

(65) Prior Publication Data

US 2019/0347654 A1  Nov. 14, 2019

(30) Foreign Application Priority Data

May 10, 2018 (CN) .......................... 201810443371.5

(51) Int. Cl.
    *G06Q 20/38* (2012.01)
    *G06Q 20/40* (2012.01)
    (Continued)

(52) U.S. Cl.
    CPC ....... *G06Q 20/389* (2013.01); *G06Q 20/3829* (2013.01); *G06Q 20/4014* (2013.01);
    (Continued)

(58) Field of Classification Search
    CPC .......................... G06Q 20/389; G06Q 20/3829
    See application file for complete search history.

(56) References Cited

U.S. PATENT DOCUMENTS 10,102,265 B1   10/2018   Madisetti et al.
10,204,148 B2    2/2019   Madisetti et al.
(Continued)

FOREIGN PATENT DOCUMENTS

CN    102123393    7/2011
CN    106682528    5/2017
(Continued)

OTHER PUBLICATIONS

International Search Report and Written Opinion in International Application No. PCT/US2019/031391, dated Jul. 25, 2019, 6 pages.
(Continued)

*Primary Examiner* — Patrick McAtee
*Assistant Examiner* — Jason B Fenstermacher
(74) *Attorney, Agent, or Firm* — Fish & Richardson P.C.

(57) ABSTRACT

Implementations of the present specification disclose blockchain data processing methods, apparatuses, devices, and systems, including a computer-implemented method for blockchain data processing. Blockchain transaction data of a plurality of transaction participants is received. Each of the plurality of transaction participants provides a respective certificate indicating a respective legal membership in a blockchain. The respective legal membership enables processing of the blockchain transaction data. A mutual identity querying is performed to confirm whether each of the plurality of transaction participants has the respective legal membership in the blockchain. Supervision keys of a supervision node in the blockchain are determined, where the supervision node corresponds to a supervisor, and where the supervision keys are dynamically updated based on a predetermined rule. The blockchain transaction data is encrypted by using the supervision keys. The blockchain transaction data is stored.

13 Claims, 10 Drawing Sheets

(51) Int. Cl.
*H04L 9/06* (2006.01)
*H04L 9/08* (2006.01)
*H04L 9/32* (2006.01)

(52) U.S. Cl.
CPC .......... *H04L 9/0637* (2013.01); *H04L 9/0825* (2013.01); *H04L 9/3247* (2013.01); *G06Q 2220/00* (2013.01); *H04L 2209/38* (2013.01)

(56) References Cited

U.S. PATENT DOCUMENTS

| | | | |
|---|---|---|---|
| 10,255,342 B2 | 4/2019 | Madisetti et al. | |
| 2003/0115466 A1* | 6/2003 | Aull | H04L 9/3268 713/172 |
| 2011/0103589 A1* | 5/2011 | Tie | H04L 9/0825 380/282 |
| 2016/0364748 A1 | 12/2016 | Paul et al. | |
| 2016/0364787 A1* | 12/2016 | Walker | H04L 9/0891 |
| 2017/0155515 A1 | 6/2017 | Androulaki et al. | |
| 2017/0243193 A1 | 8/2017 | Manian et al. | |
| 2017/0344988 A1 | 11/2017 | Cusden et al. | |
| 2017/0345011 A1 | 11/2017 | Salami et al. | |
| 2018/0019993 A1 | 1/2018 | Kravitz et al. | |
| 2018/0034642 A1 | 2/2018 | Kaehler | |
| 2018/0191502 A1* | 7/2018 | Karame | G06F 21/6245 |
| 2018/0300382 A1 | 10/2018 | Madisetti et al. | |
| 2018/0309567 A1 | 10/2018 | Wooden | |
| 2018/0373776 A1 | 12/2018 | Madisetti et al. | |
| 2019/0018887 A1 | 1/2019 | Madisetti et al. | |
| 2019/0018888 A1 | 1/2019 | Madisetti et al. | |
| 2019/0050832 A1* | 2/2019 | Wright | H04L 9/3066 |
| 2019/0220615 A1* | 7/2019 | Zhang | H04L 67/1002 |
| 2019/0325512 A1 | 10/2019 | Watson | |
| 2020/0374135 A1* | 11/2020 | Lu | H04L 9/008 |
| 2020/0387893 A1* | 12/2020 | Maim | H04L 9/3234 |

FOREIGN PATENT DOCUMENTS

| | | |
|---|---|---|
| CN | 106779707 | 5/2017 |
| CN | 106845960 | 6/2017 |
| CN | 107038638 | 8/2017 |
| CN | 107425982 | 12/2017 |
| CN | 107464118 | 12/2017 |
| EP | 3257191 | 12/2017 |
| TW | 201816679 | 5/2018 |
| WO | WO 2017090041 | 6/2017 |
| WO | WO 2018006072 | 1/2018 |
| WO | WO 2018200166 | 11/2018 |
| WO | WO 2018224431 | 12/2018 |
| WO | WO 2019090005 | 5/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in Application No. 19800241.2, dated Dec. 8, 2020, 8 pages.
PCT International Preliminary Report on Patentability in International Application No. PCT/US2019/031391, dated Nov. 10, 2020, 7 pages.

* cited by examiner

BLOCKCHAIN DATA PROCESSING METHODS, APPARATUSES, DEVICES, AND SYSTEMS

CROSS-REFERENCE TO RELATED APPLICATIONS

This application claims priority to Chinese Patent Application No. 201810443371.5, filed on May 10, 2018, which is hereby incorporated by reference in its entirety.

TECHNICAL FIELD

Solutions in implementations of the present specification pertain to the field of computer data processing technologies, and in particular, relate to blockchain data processing methods, apparatuses, devices, and systems.

BACKGROUND

With the rapid development of the Internet, various types of data emerge and grow explosively. The blockchain has currently become a research focus in many technical fields because the blockchain is characterized by decentralization, tamper-resistance, distribution, etc.

In a blockchain application, for example, both parties can reach an agreement offline on contract content or contract execution, and then store related data in a blockchain. In some blockchain applications, blockchain transaction data needs to be supervised, to supervise and prevent illegal transactions. Therefore, blockchain data services urgently need a solution that can implement transaction supervision more effectively and securely.

SUMMARY

Implementations of the present specification are intended to provide blockchain data processing methods, apparatuses, devices, and systems, so that a supervisor can be supported in supervising a blockchain transaction, and supervision security and reliability can be improved.

The blockchain data processing methods, apparatuses, devices, and the systems that are provided in the implementations of the present specification are implemented in the following ways.

A blockchain data processing method is provided, where the method includes: determining supervision keys of a supervision node in a blockchain, where the supervision keys are dynamically updated based on a predetermined rule; and encrypting blockchain transaction data by using the supervision keys.

A blockchain data processing method is provided, where the method includes: dynamically generating supervision keys based on a predetermined rule, where the supervision keys include a supervision public key and a supervision private key that are generated based on an asymmetric encryption algorithm; and broadcasting the generated supervision public key in a blockchain network.

A blockchain data processing apparatus is provided, where the apparatus includes: a supervision key determining module, configured to determine supervision keys of a supervision node in a blockchain, where the supervision keys are dynamically updated based on a predetermined rule; and a supervision and encryption processing module, configured to encrypt blockchain transaction data by using the supervision keys.

A blockchain data processing apparatus is provided, where the apparatus includes: a key generation module, configured to dynamically generate supervision keys based on a predetermined rule, where the supervision keys include a supervision public key and a supervision private key that are generated based on an asymmetric encryption algorithm; and a key broadcasting module, configured to broadcast the generated supervision public key in a blockchain network.

A blockchain data processing device is provided, where the processing device includes a processor and a memory configured to store a processor-executable instruction, and when executing the instruction, the processor implements the following operations: determining supervision keys of a supervision node in a blockchain, where the supervision keys are dynamically updated based on a predetermined rule; and encrypting blockchain transaction data by using the supervision keys.

A blockchain data processing device is provided, where the processing device includes a processor and a memory configured to store a processor-executable instruction, and when executing the instruction, the processor implements the following operations: dynamically generating supervision keys based on a predetermined rule, where the supervision keys include a supervision public key and a supervision private key that are generated based on an asymmetric encryption algorithm; and broadcasting the generated supervision public key in a blockchain network.

A blockchain system, including a blockchain node device and a supervision node device, where the blockchain node device and the supervision node device each include at least one processor and a memory configured to store a processor-executable instruction, and when executing the instruction, a processor of the blockchain node device implements: the steps of the method applied to a blockchain node side in the present specification; and when executing the instruction, a processor of the supervision node device implements the steps of the method applied to a supervision node side in the present specification.

According to the blockchain data processing methods, apparatuses, devices, and the systems that are provided in the implementations of the present specification, a supervisor can be supported in supervising a blockchain transaction. In addition, supervision keys of a supervision node are dynamically updated, and updated supervision keys are broadcasted in an entire blockchain network and are recorded by each blockchain node. The dynamically updated supervision keys can effectively improve supervision security and reliability.

BRIEF DESCRIPTION OF DRAWINGS

To describe the technical solutions in the implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

To make a person skilled in the art better understand the technical solutions in the present specification, the following clearly and comprehensively describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on one or more implementations of the present specification without creative efforts shall fall within the protection scope of the implementations of the present specification.

The blockchain technology is briefly referred to as BT, and is also referred to as a distributed ledger technology. The blockchain technology is an Internet database technology, and is characterized by decentralization, transparency, data tamper-resistance, etc. Currently, the blockchain technology has been extended from a simple digital currency application to various fields of the economic society, such as financial services, supply chain management, cultural entertainment, real estate, health care, and e-commerce. Multiple users, groups, or organizations in a blockchain can establish a consortium blockchain or a private chain, and join the blockchain to become members of the blockchain. Data of a transaction between members can be stored in the blockchain. For example, content of a contract that is signed off-chain can be stored in the blockchain.

It is worthwhile to note that "off-chain" or "on-chain" in the implementations of the present specification mainly means whether a data operation is performed on a blockchain. For example, operations off a blockchain such as offline contract negotiation between users, identity authentication performed by an authentication mechanism, and certificate issuing can be off-chain operations. Submission of a public key or a certificate to a blockchain, verification on a blockchain node, data storage, etc. can be on-chain operations. For example, submission of data to a blockchain for storage can be referred to as publishing to a blockchain network.

Figure 1:
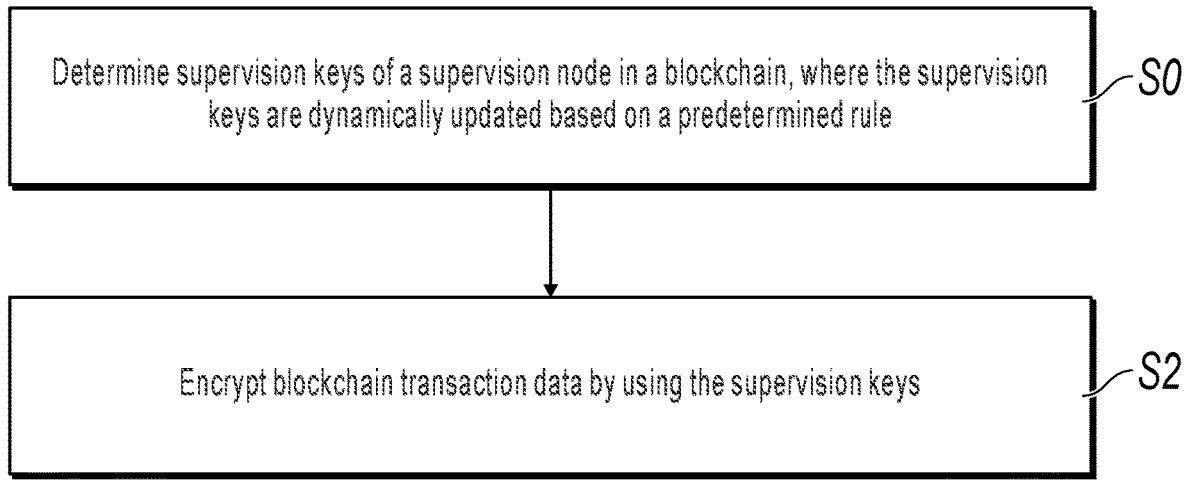
FIG. 1 is a schematic processing flowchart illustrating an implementation of a method, according to the present specification.

Conventional contracts are generally recorded on paper after contract participants reach an agreement through negotiation and discussion. The contract in the implementations of the present specification can be stored and record in a blockchain in a digitization form or other computer (such as quantum computer) data storage forms. The contract in the implementations of the present specification can include contract creation and execution. The transaction in the implementations of the present specification can include a contract-related data operation. For example, submission of data generated during contract creation to a blockchain can be considered as a transaction, and submission of data generated during contract content updating to the blockchain can be considered as a new transaction act. Certainly, the transaction can further include other blockchain data operations. The creation can include formulating a format contract in advance by one or more contract participants or a third party. Some necessary rights/obligations can be predetermined, and specific content matters of the format contract can be set and determined based on a cooperation demand of the participants. After the format contract is determined, the format contract can be stored in a blockchain after being processed based on a temporary key, and data corresponding to the format contract can be referred to as creation data. The contract participants generate a new contract by filling in, modifying, updating, etc. contract content based on the format contract, or the contract participants confirm the content and sign the contract for validation. It can be referred to as contract execution. For example, contract participants A and B reach a consensus offline on an execution process of target contract T_C (a pre-created format contract), to generate a new contract including new contract content. Content of the new contract can be stored in the blockchain after being processed by using temporary identity information or a temporary key. In one or more implementations of the present specification, a blockchain node can encrypt transaction data by using supervision keys both in a contract creation process and in a contract execution process. FIG. 1 is a schematic flowchart illustrating an implementation of a blockchain data processing method, according to the present specification. Specifically, as shown in FIG. 1, the method can include the following steps:

S0. Determine supervision keys of a supervision node in a blockchain, where the supervision keys are dynamically updated based on a predetermined rule.

S2. Encrypt blockchain transaction data by using the supervision keys.

Generally, the supervision keys can be generated by the supervision node. For example, a processing device of the People's Bank of China generates supervision keys, or a supervision node specified in a consortium blockchain generates supervision keys. Transaction participants generally include participants involved in a transaction, for example, participants A and B involved in transaction content. In this implementation, the transaction participants can further include other agreed participants, such as a third party, a guarantor, a supervisor, etc. that are not involved in the transaction content. For example, in the previous contract creation (formulation) transaction, transaction participants can exist in multiple forms. For example, the same contract participants can create different contracts. For example, contract participants A and B can create contract T_C1, and can also create contract T_C2. The same participant can create different contracts with different partners. For example, contract participant A can create contract T_C3 with contract participant B, and contract participant A can also create contract T_C4 with contract participant D.

In some implementations of the present specification, transaction-related data such as contract content, contract modifications, and transaction participant identities can be encrypted by using the supervision keys. Data information encrypted by using the supervision keys can be decrypted by the supervision node, to implement transaction supervision. The supervision keys can be implemented by using a symmetric encryption method or an asymmetric encryption method. In an application scenario of the blockchain data processing method in this implementation, an asymmetric encryption algorithm can be used to generate the supervision keys, for example, a supervision public key and a supervision private key. The generated supervision public key can be broadcasted in a blockchain network and recorded by each blockchain node. Therefore, in an implementation of the method provided in the present specification, the method includes the following steps:

S02. The supervision keys include a supervision public key and a supervision private key that are generated based on an asymmetric encryption algorithm, and in response to determining that the supervision public key is updated, a blockchain node receives and records a new supervision public key after the supervision node broadcasts the new supervision public key in a blockchain network.

Unlike a symmetric encryption algorithm, the asymmetric encryption algorithm generates two keys: a public key and a private key. The public key and the private key are a pair. If the public key is used to encrypt data, only the corresponding private key can be used to decrypt the data. If the private key is used to encrypt data, only the corresponding public key can be used to decrypt the data. In some implementations of the present specification, algorithms used during asymmetric encryption can include RSA, ElGamal, the knapsack algorithm, Rabin, D-H, ECC (elliptic curve cryptography), etc.

In this implementation, the supervision keys are generated by using the asymmetric encryption algorithm. The supervision keys can be dynamically updated, and a specific update method can be performed based on the predetermined rule. For example, the supervision keys are updated once a day or once a week, and a supervision public key in updated supervision keys is broadcasted to blockchain nodes in a blockchain. The blockchain node can perform verification on a supervision message by using the supervision public key, to confirm whether the supervision message is a supervision message sent by a real supervisor (the supervision node).

Therefore, in an implementation of the method, when updating a supervision key, the blockchain node can directly update a local supervision key of the blockchain node after receiving a new supervision key. As such, key updating can be quickly implemented. Therefore, in another implementation of the method, the determining supervision keys of a supervision node in a blockchain can include the following steps:

S040. Receive a new supervision public key broadcasted by the supervision node in the blockchain network.

S042. Update a locally stored supervision key to the new supervision public key.

In another implementation of the method, verification can be further performed on a received updated supervision key, to determine whether the received updated supervision key is a new supervision key sent by a real supervisor, thereby preventing illegal supervision-key forgery. Specifically, in another implementation of the method, the determining supervision keys of a supervision node in a blockchain can include the following steps:

S060. Receive a new supervision public key broadcasted by the supervision node in the blockchain network, where the new supervision public key includes data signed by using a non-updated supervision private key.

S062. Perform signature verification on the received signed data by using a public key in stored previously-updated supervision keys.

S064. Update a locally stored supervision key to the new supervision public key if the verification succeeds.

When updating the supervision key, the supervisor can first sign the new supervision public key by using a previous private key, to prove that the broadcasted new supervision public key is sent by the real supervisor. After receiving a supervision key update message, the blockchain node can perform verification on the supervision key update message by using a stored latest supervision public key. The blockchain node can update the locally stored supervision key to the updated supervision key (supervision public key) if the verification succeeds. Updated key information can still be kept in the blockchain node.

Supervision and encryption that are based on the supervision keys can be designed to be performed in one or more processing steps of one transaction as needed. For example, when the transaction is initiated, identity information of transaction participants can be encrypted by using the supervision keys, transaction content can be encrypted by using the supervision keys, or data can be encrypted by using the supervision keys before or after the data is uploaded to the blockchain. In an implementation provided in the present specification, the encrypting blockchain transaction data by using the supervision keys can include at least one of the following: encrypting transaction content by using the supervision public key; encrypting, by using the supervision public key, a private key used by a transaction participant to sign a transaction; or encrypting, by using the supervision public key, a private key used by the transaction participant to sign a temporary identity.

In an example of encrypting the transaction content, new contract content confirmed during contract execution is encrypted. The public key can be used to perform verification on data obtained after a transaction is signed by a transaction participant by using the private key, and can also be used to encrypt user identity data information. In the previous descriptions, the supervision keys are used to encrypt data information of one or more data processing nodes in a transaction because the supervision node can use a corresponding decryption key for decryption, to view the data information in the transaction and implement transaction supervision.

Figure 2:
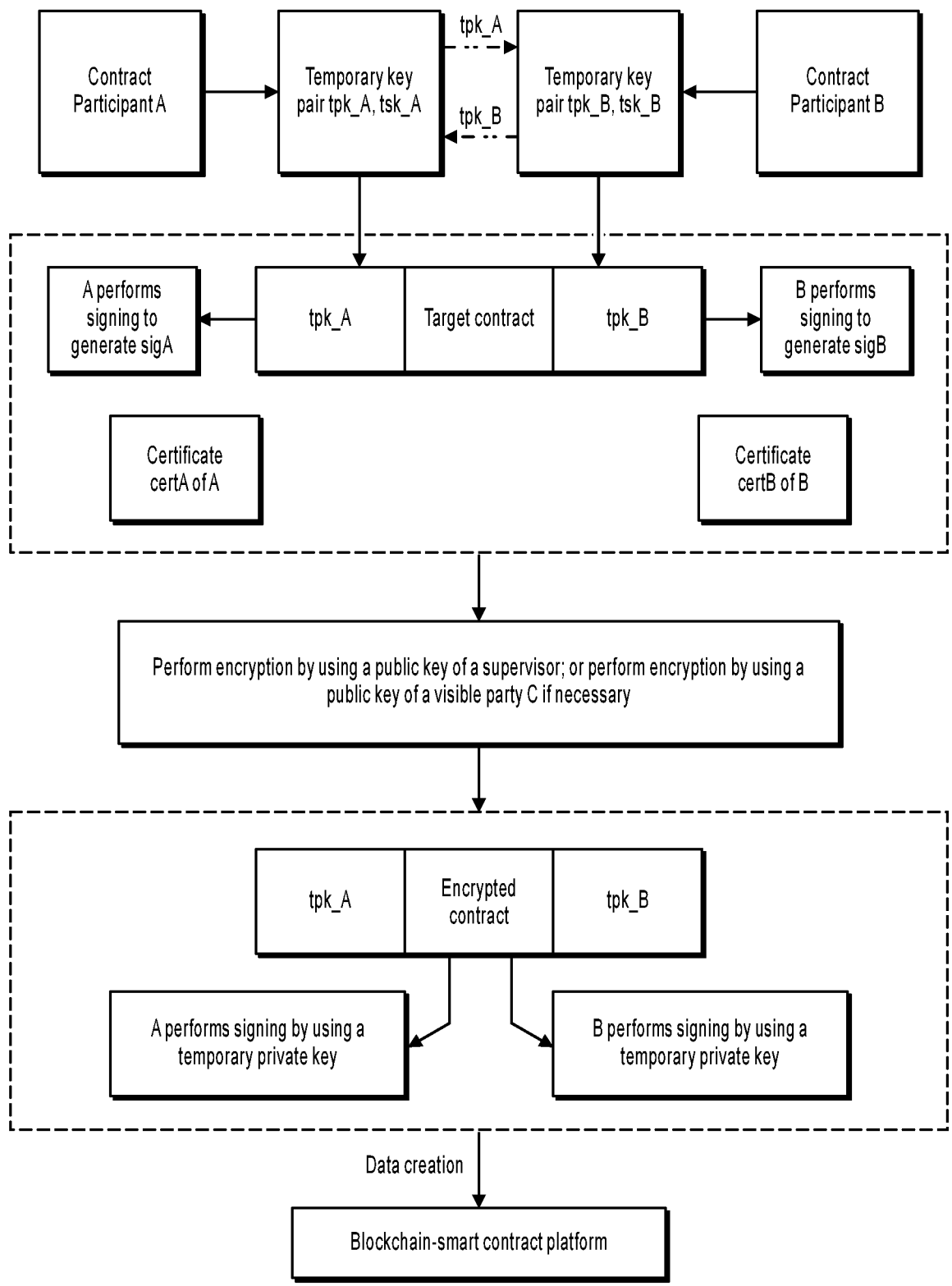
FIG. 2 is a schematic scenario diagram illustrating an implementation of a blockchain data processing method, according to the present specification.

The following describes the solutions in the implementations of the present specification by using a specific blockchain transaction application scenario as an example. Specifically, FIG. 2 is a schematic scenario diagram illustrating an implementation of a blockchain data processing method, according to the present specification. Although the present specification provides the method operation steps or apparatus structures shown in the following implementations or the accompanying drawings, the method or apparatus can include more or fewer operation steps or modules/units based on conventional or non-creative efforts. For steps or structures having no logical necessary cause-effect relationship, an execution sequence of these steps or a module structure of the apparatus is not limited to the execution sequence or the module structure shown in the implementations or the accompanying drawings of the present specification. In an actual apparatus, server, or terminal product application, the method or the module structure can be performed sequentially or in parallel based on the method or the module structure shown in the implementations or the accompanying drawings (for example, a parallel processing or multi-threaded processing environment, or even an implementation environment including distributed processing and server clustering).

The transaction can include creation of the previously described format contract, and can also include signing and confirmation of a formal contract. Subsequently, the transaction can further include contract execution processing. Certainly, the descriptions in the following implementations constitute no limitation on other technical solutions that can be obtained based on the present specification. For example, in another implementation scenario, more broadly, the transaction can further include data that need to be stored by a single party, both parties, or multiple parties in a blockchain to update blockchain node data, such as a memo, a contract, a regulation, a report, and a notification. A specific application scenario is shown in FIG. 2. It is assumed that a target contract relates to contract participants A and B. A and B are members of a consortium chain and hold respective certificates. The certificates can prove that A and B are legal members of the blockchain and can perform processing such as contract creation and execution on the blockchain.

A and B can independently generate respective temporary key pairs: (tpk_A, tsk_A) and (tpk_B, tsk_B). Temporary public keys of both parties can be used to transmit data by using an established end-to-end encryption channel, for example, an end-to-end encryption channel that is based on the Secure Sockets Layer (SSL) protocol. As such, data transmission security can be further improved. To satisfy an end-to-end offline communication demand of two users in a blockchain, mutual identity verification usually needs to be performed between users (including contract participants). In addition, the two users can communicate with each other in the same blockchain, and the two users perform mutual identity querying by using the blockchain, to confirm whether a peer party is a legal user of the blockchain. A specific procedure can include the following steps:

(1) Users A and B can register entity information and digital identities on a blockchain platform in a form of a smart contract or a non-smart contract by using a blockchain registration mechanism. The blockchain platform performs signature verification on the registration mechanism, and the entity information and the digital identities of A and B are stored on a blockchain after the verification succeeds. The digital identity can include a public key, a private key, etc. of a user, and the entity information can include information such as a name and an ID card of the user.

(2) Users A and B establish an encryption channel. A and B first send each other's digital identity summaries to the blockchain platform. After finding that A and B are legal users, the platform returns acknowledgement messages to A and B. Otherwise, the platform returns declination messages, and communication between A and B is terminated.

(3) To confirm an identity of B, A can obtain query authorization (namely, a signature for a query request from A) from B, and submit a query application to the blockchain. B also performs the present step to submit a query application for A.

(4) The blockchain platform performs verification on query and authorization signatures of A and B, and finds that A and B are blockchain users, and then respectively sends the entity information of A and B to both parties. If neither A nor B is a blockchain user, the platform returns a failure message, and communication between A and B is terminated.

(5) After confirming each other's entity information, A and B establish an encryption channel based on the digital identities, to exchange a message, for example, exchange temporary public keys.

After sending the temporary public keys to each other, A and B can sign (contract content of the target contract, tpk_A, and tpk_B) by using respective private keys, to generate respective data signed by using the private keys. Here, the respective data signed by using the private keys can be collectively referred to as first signed data. Likewise, a signature for the contract content of the target contract can also be briefly referred to as a signature for the target contract. For example, A can sign (the target contract, tpk_A, and tpk_B) by using the private key tsk_A, to generate first signed data sigA of A, and B can sign (the target contract, tpk_A, and tpk_B) by using the private key tsk_B, to generate first signed data sigB of B. A and B can send the first signed data to each other. For example, A sends sigA to B.

In some implementation application scenarios, a contract transaction can be supervised by a supervisor, and the supervisor can check, consult, review, and prevent a contract, to supervise contract-based illegal acts. In some implementations, the supervisor can include a legal supervision institution, for example, a national finance institution such as the Central Bank or the China Securities Regulatory Commission, and can supervise a blockchain transaction by using supervision keys. In some other implementations, a supervisor that has a supervision authority can be agreed in contract rules, for example, the supervisor can be one or more specified members. Alternatively, in another implementation, a member has supervision rights if the member is agreed on by a predetermined number or proportion of members. Here, the predetermined number or proportion of members can form a supervision member group. If there are 10 members in a blockchain, it can be predetermined that member A can act as a supervisor if seven members or 70% of the members agree on member A.

Information content encrypted by using a supervision public key broadcasted by a supervisor can include a target contract (contract content), temporary public keys of all contract participants, and signed data of all the contract participants, and can further include certificates of all the contract participants. For example, A encrypts (the target contract, tpk_A, tpk)_B, sigA, sigB, certA, and certB) by using supervision keys, to generate an encrypted contract. The encrypted contract can be generated by any one of the contract participants. As such, the supervisor can obtain the target contract from a blockchain by using a corresponding decryption key, such as a private key, to verify whether the contract participants are illegal, whether the contract content is illegal, etc. As such, the supervisor implements contract supervision on the blockchain. For example, if the supervisor decrypts the contract, and after reviewing the contract content and a foreign partner, the supervisor finds that the contract relates to an illegal technology transfer of a national defense patent, the supervisor can prevent the contract by submitting the blockchain transaction. Certainly, in another implementation, if the transaction related to the target contract is visible to another blockchain member C, the target contract can also be encrypted by using a public key of C. For a processing method for encrypting the target contract by using the public key of C and decrypting, by member C, the target contract for reviewing, references can be made to the previous processing performed by the supervisor, and details are omitted here for simplicity.

Before the generated encrypted contract is submitted to a chain, all the contract participants can sign the encrypted contract by using private keys, and signed data and the temporary public keys tpk_A and the tpk_B of all the contract participants are used as creation data stored in the blockchain.

The creation data can be submitted to the blockchain for storage. Certainly, a smart contract platform can further be disposed on the blockchain, and the creation data can be submitted to the smart contract platform and managed by the smart contract platform.

Figure 3:
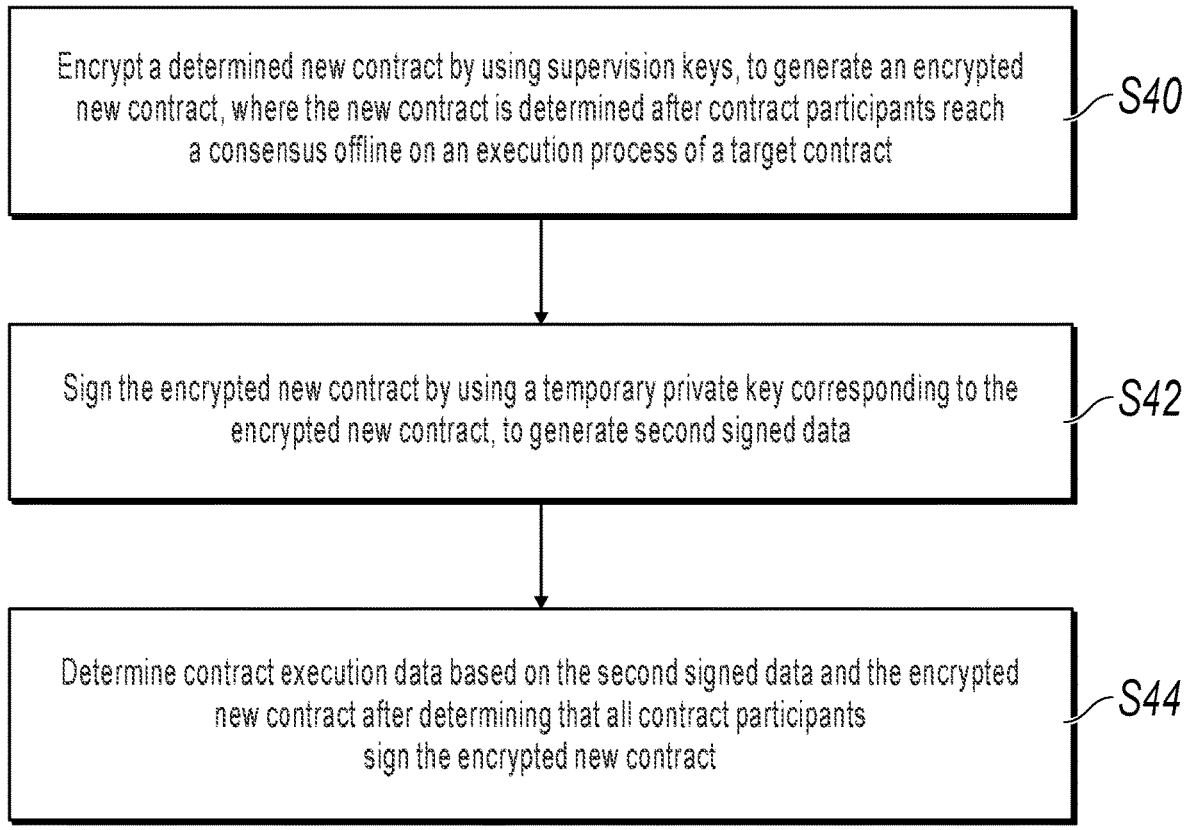
FIG. 3 is a schematic scenario diagram illustrating an implementation of a blockchain data processing method, according to the present specification.

The previous implementation describes an implementation scenario in which the contract is created and stored in the blockchain by using the temporary key. The following describes an implementation scenario in which the contract is executed by using a temporary key. FIG. 3 is a schematic flowchart illustrating a contract execution implementation in a blockchain data processing method, according to the present specification. As shown in FIG. 3, the blockchain data can further include contract execution data, and the contract execution data can be determined in the following steps:

S40. Encrypt a determined new contract by using supervision keys, to generate an encrypted new contract, where the new contract is determined after contract participants reach a consensus offline on an execution process of a target contract.

S42. Each contract participant signs the encrypted new contract by using a temporary private key corresponding to the encrypted new contract, to generate second signed data.

S44. Determine contract execution data based on the second signed data and the encrypted new contract.

The processing in S44 can be understood as that after determining that all the contract participants sign the encrypted new contract, a processing apparatus of the contract participants determines the contract execution data based on the second signed data and the encrypted new contract. For example, when a contract participant determines that all the contract participants (including the contract participant) perform signing by using the temporary private key, the contract participant determines the second signed data obtained after all the contract participants perform signing and the encrypted new contract as the contract execution data. Then, the contract participant can submit the contract execution data to a blockchain. The temporary key corresponding to the encrypted new contract in S42 can be the same as or different from a temporary key that was used when the target contract corresponding to the encrypted new contract is created. For example, a temporary-key change period is reached when contract content is updated to sign the determined new contract. In this case, the temporary key used to sign the encrypted new contract is different from the temporary key that was previously used when the corresponding target contract is created and stored in the blockchain. The updated temporary key can be updated to corresponding data in the blockchain by submitting the transaction.

Figure 4:
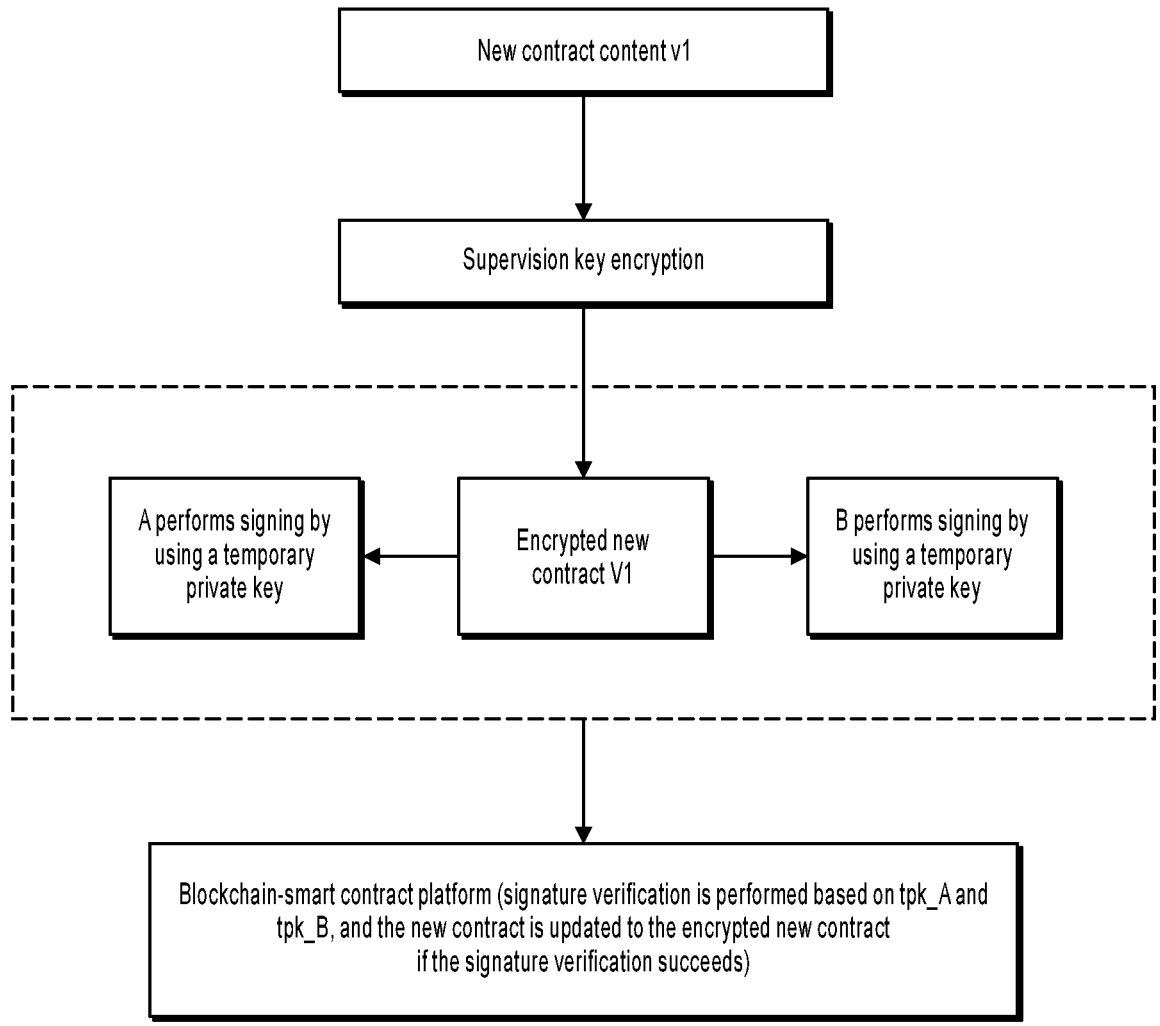
FIG. 4 is a schematic diagram illustrating an implementation of processing data by using a temporary key in a contract execution process, according to the present specification.

FIG. 4 is a schematic diagram illustrating an implementation of processing data by using a temporary key in a contract execution process, according to the present specification. As shown in FIG. 4, it is assumed that contract execution relates to interests of both parties A and B. A and B reach a consensus on a contract execution process, for example, add or modify contract content to form new contract v1. A or B encrypts the new contract by using supervision keys, to generate encrypted new contract V1. Then, each contract participant can perform signing by using a temporary private key corresponding to an original target contract. For example, A can perform signing by using a temporary private key tsk_A that was used when the target contract is established, and then B can perform signing by using a temporary private key tsk_B. Signed data of all the contract participants and the encrypted new contract are submitted to a chain. Data that includes the second signed data and data that is of the encrypted new contract and that is to be submitted to the blockchain can be referred to as the contract execution data, and can also be referred to as the contract execution data after being submitted to the blockchain for storage. Creation data of the previous target contract can be determined in a similar way. In this process, different from contract creation, A and B may not need to obtain authorization from a supervisor when performing contract status transfer, such as contract modification, contract validation, contract suspension, and contract termination. Contract content and a contract status can take effect after each contract participant performs encryption by using a supervision public key and performs signing by using a private key, to determine a new contract or determine that a contract status is transferred. In this implementation, the supervisor can consult the contract for transaction data information. Unless in a special case, transaction initiation or execution such as contract updating may not need to be authorized by the supervisor.

The generated blockchain data can be submitted to the blockchain for storage. Certainly, a smart contract platform can further be disposed on the blockchain, and the blockchain data can be submitted to the smart contract platform and managed by the smart contract platform.

Figure 5:
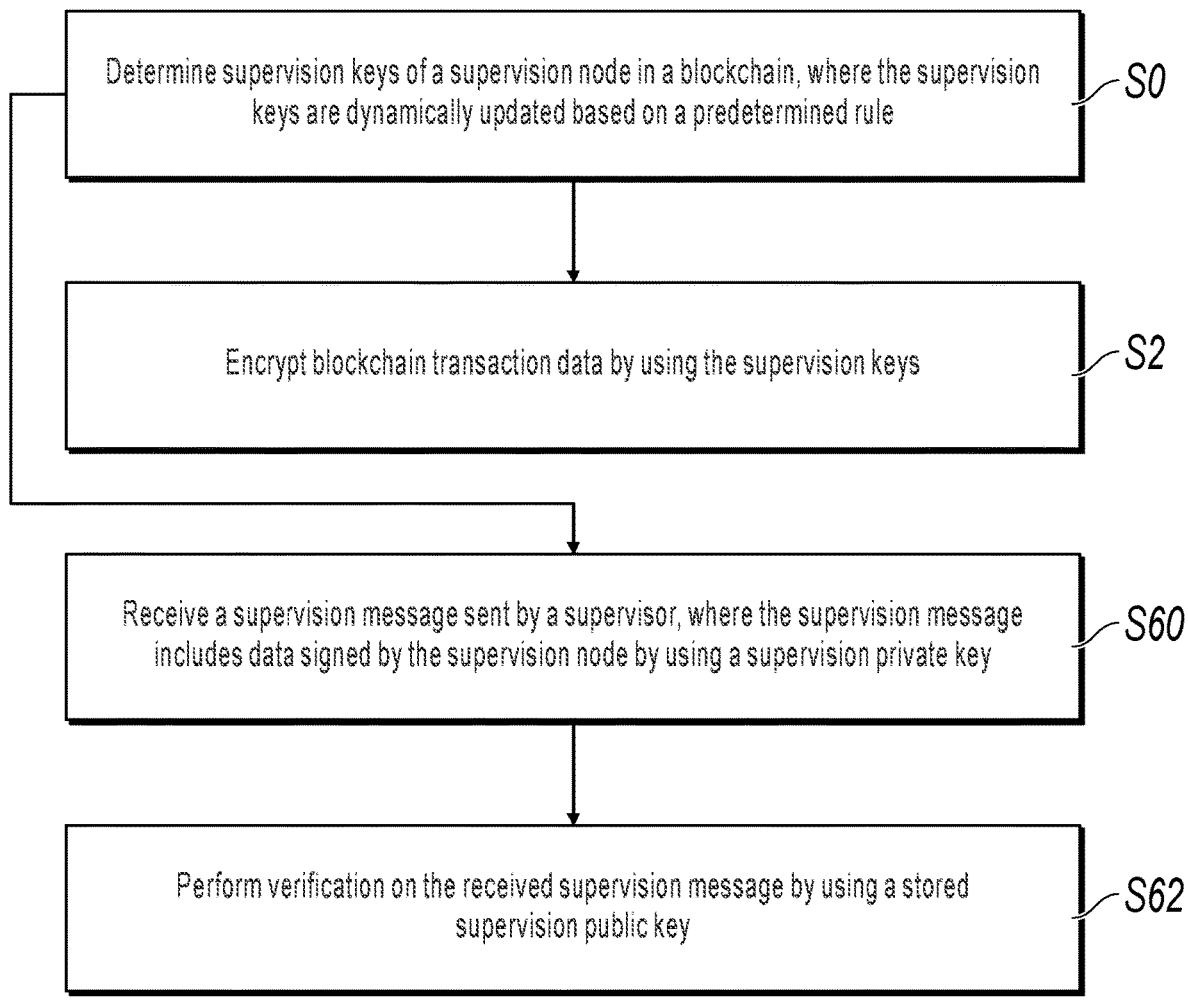
FIG. 5 is a schematic processing flowchart illustrating another implementation of a method, according to the present specification.

If a supervision node performs transaction management, the supervision node can initiate a supervision message, and put transaction participants in a blacklist to restrict permissions of the transaction participants or prevent the transaction, to implement transaction supervision. As shown in FIG. 5, the method can further include the following steps:

S60. Receive a supervision message sent by a supervisor, where the supervision message includes data signed by the supervision node by using a supervision private key.

S62. Perform verification on the received supervision message by using a stored supervision public key.

Figure 6:
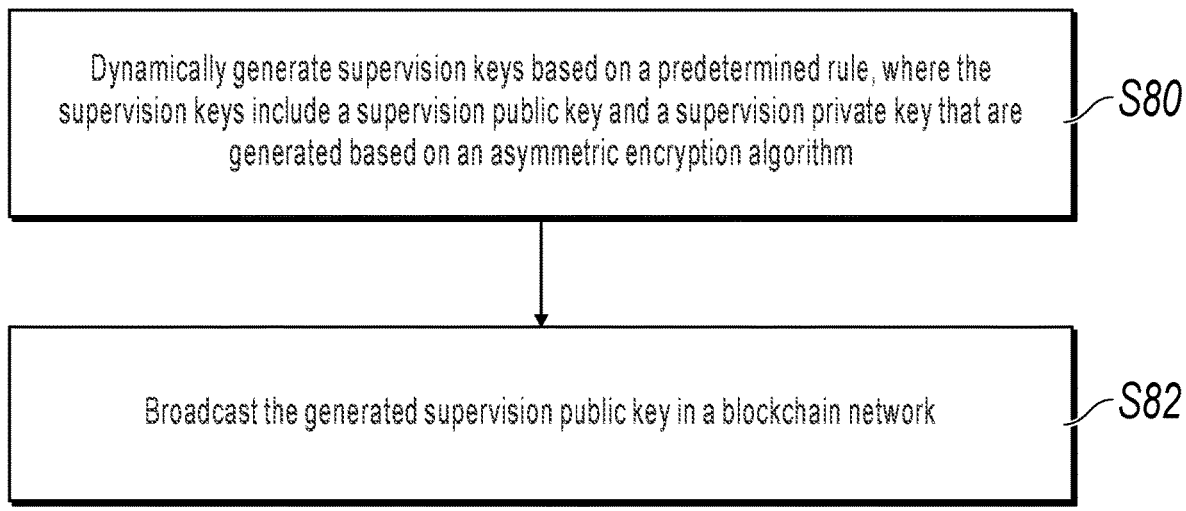
FIG. 6 is a schematic processing flowchart illustrating another implementation of a method, according to the present specification.

The implementation solutions are described previously in some implementations from a perspective of a conventional blockchain member. For the supervision node, the present specification further provides another implementation of the method. As shown in FIG. 6, the method can include the following steps:

S80. Dynamically generate supervision keys based on a predetermined rule, where the supervision keys include a supervision public key and a supervision private key that are generated based on an asymmetric encryption algorithm.

S82. Broadcast the generated supervision public key in a blockchain network.

The previous one or more implementations can be performed by a processing device of a blockchain node of a transaction participant, including a device that communicates with a server of the blockchain node; or can be performed on the server of the blockchain node; or can be performed on a blockchain client. For example, the client performs contract creation and execution by using the supervision keys, and the server of the blockchain node stores blockchain data.

The implementations of the present specification provide the blockchain data processing methods, so that the supervisor can be supported in supervising a blockchain transaction. In addition, supervision keys of a supervision node are dynamically updated, and updated supervision keys are broadcasted in an entire blockchain network and are recorded by each blockchain node. The dynamically updated supervision keys can effectively improve supervision security and reliability.

The previous method implementations of the present specification are described in a progressive way. For same or similar parts of the implementations, mutual references can be made to the implementations. Each implementation focuses on a difference from other implementations. For related parts, references can be made to partial descriptions in the method implementations.

Figure 7:
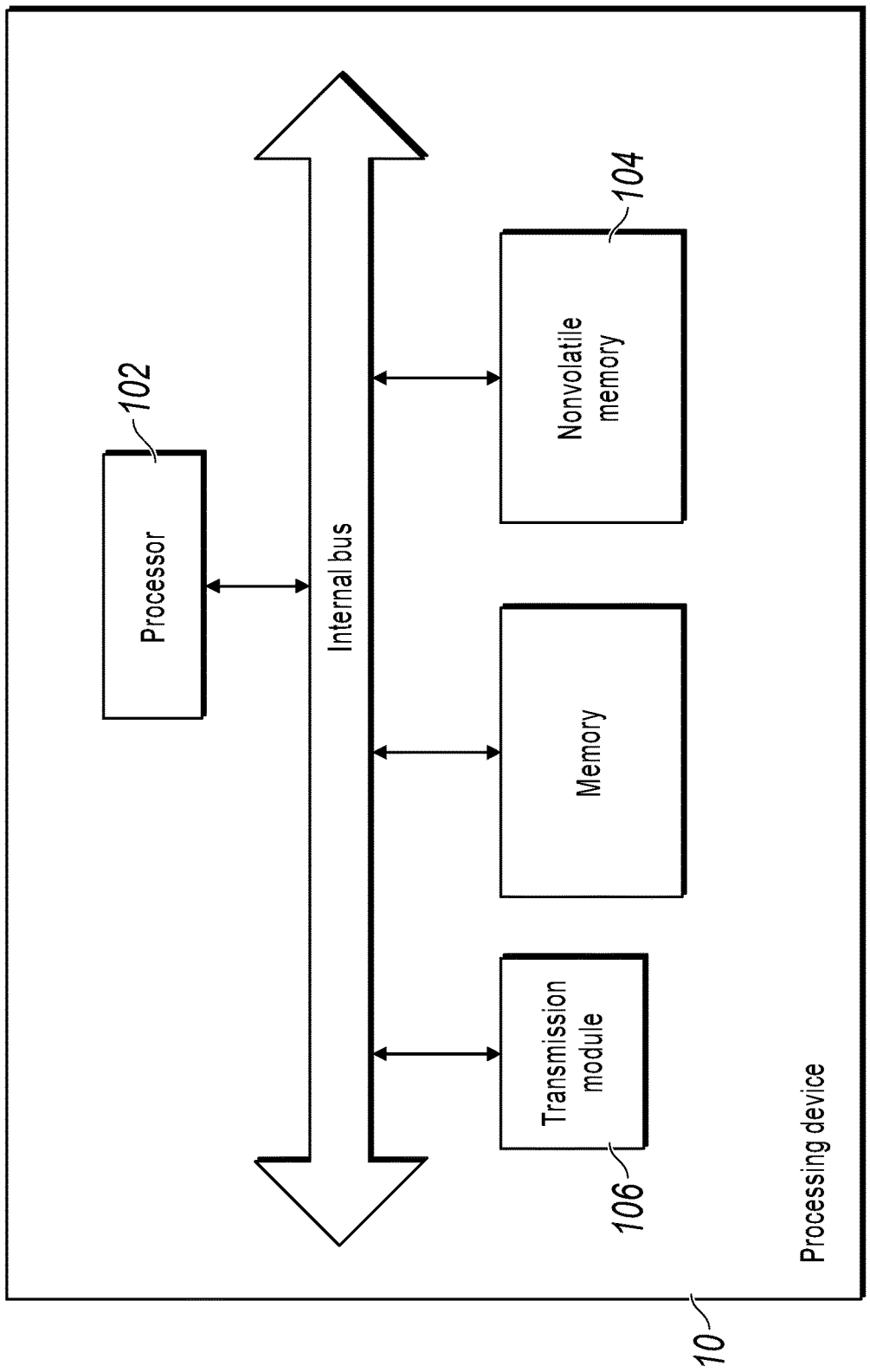
FIG. 7 is a structural block diagram illustrating hardware of a blockchain data processing device, according to an implementation of the present invention.

The method implementations provided in the implementations of the present application can be performed by a blockchain terminal, a blockchain server, or a similar operation apparatus. For example, the method implementations are performed by a blockchain node device (which can be a client, a single server, or a server cluster). FIG. 7 is a structural block diagram illustrating hardware of a blockchain data processing device, according to an implementation of the present invention. As shown in FIG. 7, a blockchain processing device 10 can include one or more (only one in FIG. 7) processors 102 (the processor 102 can include but is not limited to a processing apparatus such as a microprocessor (such as an MCU) or a programmable logic device (such as an FPGA), a memory 104 configured to store data, and a transmission module 106 that has a communication function. A person of ordinary skill in the art can understand that the structure shown in FIG. 7 is merely an example, and constitutes no limitation on a structure of the previous processing device. For example, the processing device 10 can further include more or fewer components than those shown in FIG. 7. For example, the processing device 10 can further include other processing hardware such as a Graphics Processing Unit (GPU). Alternatively, the processing device 10 can have a configuration different from that shown in FIG. 7.

The memory 104 can be configured to store an application software program and a module, for example, a program instruction/module corresponding to the processing method in the implementations of the present invention. The processor 102 runs the software program and the module that are stored in the memory 104, to execute various function applications and data processing, in other words, to implement the previous processing method. The memory 104 can include a high-speed random access memory, and can further include a nonvolatile memory, for example, one or more magnetic storage apparatuses, flash memories, or other nonvolatile solid-state memories. In some examples, the memory 104 can further include a memory disposed remotely relative to the processor 102, and the remote memory can be connected to the processing device 10 by using a network. Examples of the network include but are not limited to the Internet, an intranet, a local area network, a mobile communications network, and a combination thereof.

The transmission module 106 is configured to receive or send data by using a network. Specific examples of the network can include a wireless network provided by a communications supplier of the processing device 10. For example, the transmission module 106 includes a network interface controller (NIC) that can be connected to another network device by using a base station, to communicate with the Internet. For example, the transmission module 106 can be a radio frequency (RF) module that is configured to communicate with the Internet in a wireless way.

Figure 8:
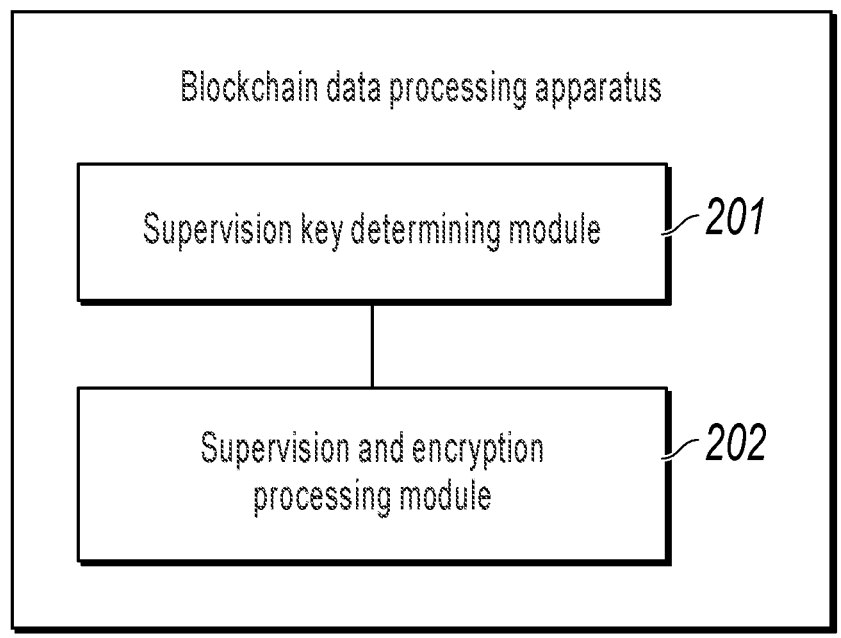
FIG. 8 is a structural block diagram illustrating modules of a blockchain data processing apparatus, according to an implementation of the present invention.

Based on the previous blockchain data processing methods, the present specification further provides a blockchain data processing apparatus. The apparatus can include an apparatus that uses a system (including a distributed system), software (an application), a module, a component, a server, a client, etc. of the method in the implementations of the present specification and that is used in combination with necessary implementation hardware. Based on the same innovative idea, a processing apparatus in an implementation provided in the present application is described in the following implementation. Because a problem-resolving solution of the apparatus is similar to that of the method, for a specific implementation of the processing apparatus in the implementations of the present specification, references can be made to the implementation of the previous method. No repeated description is provided. Although the apparatus described in the following implementation is preferably implemented by software, implementation of hardware or a combination of software and hardware is possible to conceive. Specifically, as shown in FIG. 8, a blockchain data processing apparatus that can be applied to a blockchain node can include: a supervision key determining module 201, configured to determine supervision keys of a supervision node in a blockchain, where the supervision keys are dynamically updated based on a predetermined rule; and a supervision and encryption processing module 202, configured to encrypt blockchain transaction data by using the supervision keys.

Figure 9:
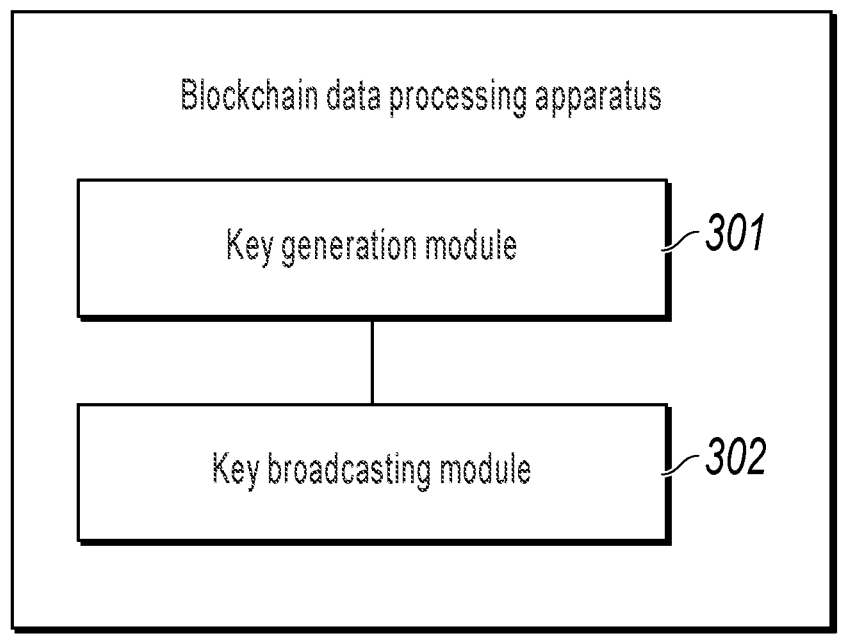
FIG. 9 is a structural block diagram illustrating modules of another blockchain data processing apparatus, according to an implementation of the present invention.

As shown in FIG. 9, the present specification further provides a blockchain data processing apparatus that can be applied to a supervision node. The blockchain data processing apparatus can specifically include: a key generation module 301, configured to dynamically generate supervision keys based on a predetermined rule, where the supervision keys include a supervision public key and a supervision private key that are generated based on an asymmetric encryption algorithm; and a key broadcasting module 302, configured to broadcast the generated supervision public key in a blockchain network.

It is worthwhile to note that the processing apparatus previously described in the implementations of the present specification can further include other implementations based on the descriptions in the related method implementations. For a specific implementation, references can be made to the descriptions in the method implementations, and details are omitted here for simplicity.

The blockchain data processing methods provided in the implementations of the present specification can be implemented by a processor in a computer by executing a corresponding program instruction. For example, the method can be implemented at a PC/server end by using the C++/java language in a Windows/Linux operating system, or can be implemented by using a corresponding application design language in another system such as an Android or iOS system in combination with necessary hardware, or can be implemented based on processing logic of a quantum computer. Specifically, an implementation of the present specification provides a processing device to implement the previous method. The processing device can include a processor and a memory configured to store a processor-executable instruction. When executing the instruction, the processor implements the following operations: determining supervision keys of a supervision node in a blockchain, where the supervision keys are dynamically updated based on a predetermined rule; and encrypting blockchain transaction data by using the supervision keys.

Based on the descriptions in the previous method implementations, in another implementation of the device, the supervision keys include a supervision public key and a supervision private key that are generated based on an asymmetric encryption algorithm, and in response to determining that the supervision public key is updated, a blockchain node receives and records a new supervision public key after the supervision node broadcasts the new supervision public key in a blockchain network.

Based on the descriptions in the previous method implementations, in another implementation of the device, the determining, by the processor, supervision keys of a supervision node in a blockchain includes: receiving a new supervision public key broadcasted by the supervision node in the blockchain network; and updating a locally stored supervision key to the new supervision public key.

Based on the descriptions in the previous method implementations, in another implementation of the device, the determining, by the processor, supervision keys of a supervision node in a blockchain includes: receiving a new supervision public key broadcasted by the supervision node in the blockchain network, where the new supervision public key includes data signed by using a non-updated supervision private key; performing signature verification on the received signed data by using a public key in stored previously-updated supervision keys; and updating a locally stored supervision key to the new supervision public key if the verification succeeds.

Based on the descriptions in the previous method implementations, in another implementation of the device, the encrypting, by the processor, blockchain transaction data by using the supervision keys includes at least one of the following: encrypting transaction content by using the supervision public key; encrypting, by using the supervision public key, a private key used by a transaction participant to sign a transaction; or encrypting, by using the supervision public key, a private key used by the transaction participant to sign a temporary identity.

Based on the descriptions in the previous method implementations, in another implementation of the device, the processor further performs the following operations: receiving a supervision message sent by a supervisor, where the supervision message includes data signed by the supervision node by using the supervision private key; and performing verification on the received supervision message by using the stored supervision public key.

Based on the descriptions in the previous method implementations, for a supervision node, another blockchain data processing device can be further provided. The processing device includes a processor and a memory configured to store a processor-executable instruction. When executing the instruction, the processor implements the following operations: dynamically generating supervision keys based on a predetermined rule, where the supervision keys include a supervision public key and a supervision private key that are generated based on an asymmetric encryption algorithm; and broadcasting the generated supervision public key in a blockchain network.

The instruction can be stored in multiple types of computer-readable storage media. The computer-readable storage media can include a physical apparatus configured to store information. The information can be digitized, and then stored in a medium that uses an electric way, a magnetic way, an optic way, etc. The computer-readable storage medium in this implementation can include: an apparatus that stores information in the electric way, for example, various memories such as a RAM or a ROM; an apparatus that stores information in the magnetic way, for example, a hard disk, a floppy disk, a magnetic tape, a magnetic core memory, a bubble memory, or a USB flash drive; and an apparatus that stores information in the optic way, such as a CD or a DVD. Certainly, there are other forms of readable storage medium, such as a quantum memory or a graphene memory. An instruction in the apparatus, the server, the client, the processing device, or the system in the implementations can be described in a similar way.

Based on the previous descriptions, an implementation of the present specification further provides a blockchain system. The blockchain system includes a blockchain node device and a supervision node device. The blockchain node device and the supervision node device each include at least one processor and a memory configured to store a processor-executable instruction. When executing the instruction, a processor of the blockchain node device implements: the steps of the method applied to a blockchain node side in the present specification; and when executing the instruction, a processor of the supervision node device implements the steps of the method applied to a supervision node side in the present specification.

It is worthwhile to note that the apparatus, the processing device, the terminal, the server, and the system previously described in the implementations of the present specification can further include other implementations based on the descriptions in the related method implementations. For a specific implementation, references can be made to the descriptions in the method implementations, and details are omitted here for simplicity.

The implementations of the present specification are described in a progressive way. For same or similar parts of the implementations, mutual references can be made to the implementations. Each implementation focuses on a difference from other implementations. Particularly, a hardware and program implementation is basically similar to a method implementation, and therefore is described briefly. For related parts, references can be made to partial descriptions in the method implementations.

Specific implementations of the present application are previously described. Other implementations fall within the scope of the appended claims. In some cases, the desired results can still be achieved even when the actions or steps described in the claims are performed in a sequence different from the sequence in the implementations. In addition, the process described in the accompanying drawings does not necessarily need a particular execution sequence to achieve the desired results. In some implementations, multi-tasking and parallel processing can be advantageous.

According to the blockchain data processing methods, apparatuses, devices, and the systems that are provided in the implementations of the present specification, a supervisor can be supported in supervising a blockchain transaction. In addition, supervision keys of a supervision node are dynamically updated, and updated supervision keys are broadcasted in an entire blockchain network and are recorded by each blockchain node. The dynamically updated supervision keys can effectively improve supervision security and reliability.

Although the present application provides the method operation steps according to the implementations or the flowcharts, more or fewer operation steps can be included based on conventional or non-creative efforts. The sequence of the steps listed in the implementations is merely one of numerous step execution sequences, and does not represent the unique execution sequence. For an actual apparatus or client product, the steps can be performed based on the method sequence illustrated in the implementations or accompanying drawings, or can be executed in parallel (for example, a parallel processing or multi-threaded processing environment).

Although the implementations of the present specification relate to the SSL encryption communication, supervision key generation method, definition description of the transaction including contract creation and execution, encryption and signing that are based on a public key and a private key, data operations such as data acquisition, definition, exchange, calculation, determining, and encryption, and data descriptions, the implementations of the present specification are not limited to the industry communications standards, standard asymmetric encryption algorithm, communications protocol, standard data model/template, or the cases described in the implementations of the present specification. A slightly modified implementation solution obtained by using some industry standards, or in a self-defined way, or based on the described implementations can also achieve an implementation effect that is the same as, equivalent to, or similar to that of the described implementations, or can achieve an expected implementation effect obtained after transformation. An implementation that is obtained by applying a modified or transformed data acquisition, storage, determining, and processing method can still fall within a scope of an optional implementation solution of the present specification.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. Almost all designers program an improved method procedure into a hardware circuit, to obtain a corresponding hardware circuit structure. Therefore, a method procedure can be improved by using a hardware entity module. For example, a programmable logic device (PLD) (such as a field programmable gate array (FPGA)) is such an integrated circuit, and a logical function of the PLD is determined by a user through device programming. The designer performs programming to "integrate" a digital system to a PLD without requesting a chip manufacturer to design and manufacture an application-specific integrated circuit chip. In addition, at present, instead of manually manufacturing an integrated chip, this type of programming is mostly implemented by using "logic compiler" software. The logic compiler is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are currently most commonly used. A person skilled in the art should also understand that a hardware circuit that implements a logical method procedure can be easily obtained provided that the method procedure is logically programmed by using the foregoing several hardware description languages and programmed into an integrated circuit.

A controller can be implemented in any appropriate way. For example, the controller can be a microprocessor, a processor, a computer-readable medium that stores computer-readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that in addition to implementing the controller by using only the computer-readable program code, logic programming can be performed on method steps to enable the controller to implement the same function in forms of the logic gate, the switch, the application-specific integrated circuit, the programmable logic controller, and the built-in microcontroller. Therefore, the controller can be considered as a hardware component, and an apparatus that is included in the controller and that is configured to implement various functions can also be considered as a structure in the hardware component. Alternatively, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, an in-vehicle human-computer interaction device, a cellular phone, a camera phone, a smartphone, a personal digital assistant, a media player, a navigation device, an email device, a game console, a tablet computer, a wearable device, or a combination of any of these devices.

Although the implementations of the present specification provide the method operation steps according to the implementations or the flowcharts, more or fewer operation steps can be included based on conventional or non-creative means. The sequence of the steps listed in the implementations is merely one of numerous step execution sequences, and does not represent the unique execution sequence. For an actual apparatus or terminal product, the steps can be performed based on the method sequence illustrated in the implementations or accompanying drawings, or can be executed in parallel (for example, a parallel processing or multi-thread processing environment, or even a distributed data processing environment). Terms "include", "comprise", or their any other variant is intended to cover non-exclusive inclusion, so that a process, a method, a product, or a device that includes a series of elements not only includes these elements, but also includes other elements that are not expressly listed, or further includes elements inherent to such process, method, product, or device. An element preceded by "includes a . . . " does not, without more constraints, preclude the existence of additional identical elements in the process, method, product, or device that includes the element.

For ease of description, the previous apparatus is described by dividing the previous apparatus into various modules based on functions. Certainly, when the implementations of the present specification are implemented, functions of various modules can be implemented in one or more pieces of software and/or hardware, or modules that implement the same function can be implemented by using a combination of multiple sub-modules or sub-units. The previously described apparatus implementations are merely examples. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections can be implemented by using some interfaces. The indirect couplings or communication connections between the apparatuses or units can be implemented in electronic, mechanical, or other forms.

A person skilled in the art also knows that in addition to implementing the controller by using only the computer-readable program code, logic programming can be performed on method steps to enable the controller to implement the same function in forms of the logic gate, the switch, the application-specific integrated circuit, the programmable logic controller, and the built-in microcontroller. Therefore, the controller can be considered as a hardware component, and an apparatus that is included in the controller and that is configured to implement various functions can also be considered as a structure in the hardware component. Alternatively, the apparatus configured to implement various functions can even be considered as both a software module implementing the method and a structure in the hardware component.

The present specification is described with reference to the flowcharts and/or block diagrams of the method, the device (system), and the computer program product based on the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed on the computer or the processor of the another programmable data processing device generate an apparatus for implementing a specific function in one or more processes in the flowcharts and/or in one or more blocks in the block diagrams.

These computer program instructions can alternatively be stored in a computer-readable memory that can instruct a computer or another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can alternatively be loaded onto a computer or another programmable data processing device, so that a series of operation steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form in a computer-readable medium, for example, a read-only memory (ROM) or a flash memory (flash RAM). The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be configured to store information accessible to the computing device. Based on the definition in the present specification, the computer-readable medium does not include transitory computer-readable media (transitory media), such as a modulated data signal and carrier.

A person skilled in the art should understand that the implementations of the present application can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a magnetic disk memory, a CD-ROM, an optical memory, etc.) that include computer-usable program code.

The implementations of the present specification can be described in the general context of computer-executable instructions, for example, a program module. Generally, the program module includes a routine, a program, an object, a component, a data structure, etc. executing a specific task or implementing a specific abstract data type. The implementations of the present specification can alternatively be practiced in distributed computing environments in which tasks are performed by remote processing devices that are connected through a communications network. In the distributed computing environment, the program module can be located in both local and remote computer storage media including storage devices.

The implementations of the present specification are described in a progressive way. For same or similar parts of the implementations, mutual references can be made to the implementations. Each implementation focuses on a difference from other implementations. Particularly, a system implementation is basically similar to a method implementation, and therefore is described briefly. For related parts, references can be made to partial descriptions in the method implementations. In the descriptions of the present specification, reference terms such as "an implementation", "some implementations", "example", "specific example", and "some examples" mean that specific features, structures, materials, or characteristics described with reference to the implementation or example are included in at least one implementation or example in the implementations of the present specification. In the present specification, example expressions of the previous terms are not necessarily with respect to the same implementation or example. In addition, the described specific features, structures, materials, or characteristics can be combined in a proper way in any one or more of the implementations or examples. In addition, a person skilled in the art can integrate or combine different implementations or examples and characteristics of different implementations or examples in the present specification, provided that they do not conflict with each other.

The previous descriptions are merely implementations of the present specification, and are not intended to limit the implementations of the present specification. For a person skilled in the art, various changes and variations can be made to the implementations of the present specification. Any modifications, equivalent substitutions, improvements, etc. made within the spirit and the principle of the implementations of the present specification shall fall within the scope of the claims in the implementations of the present specification.

Figure 10:
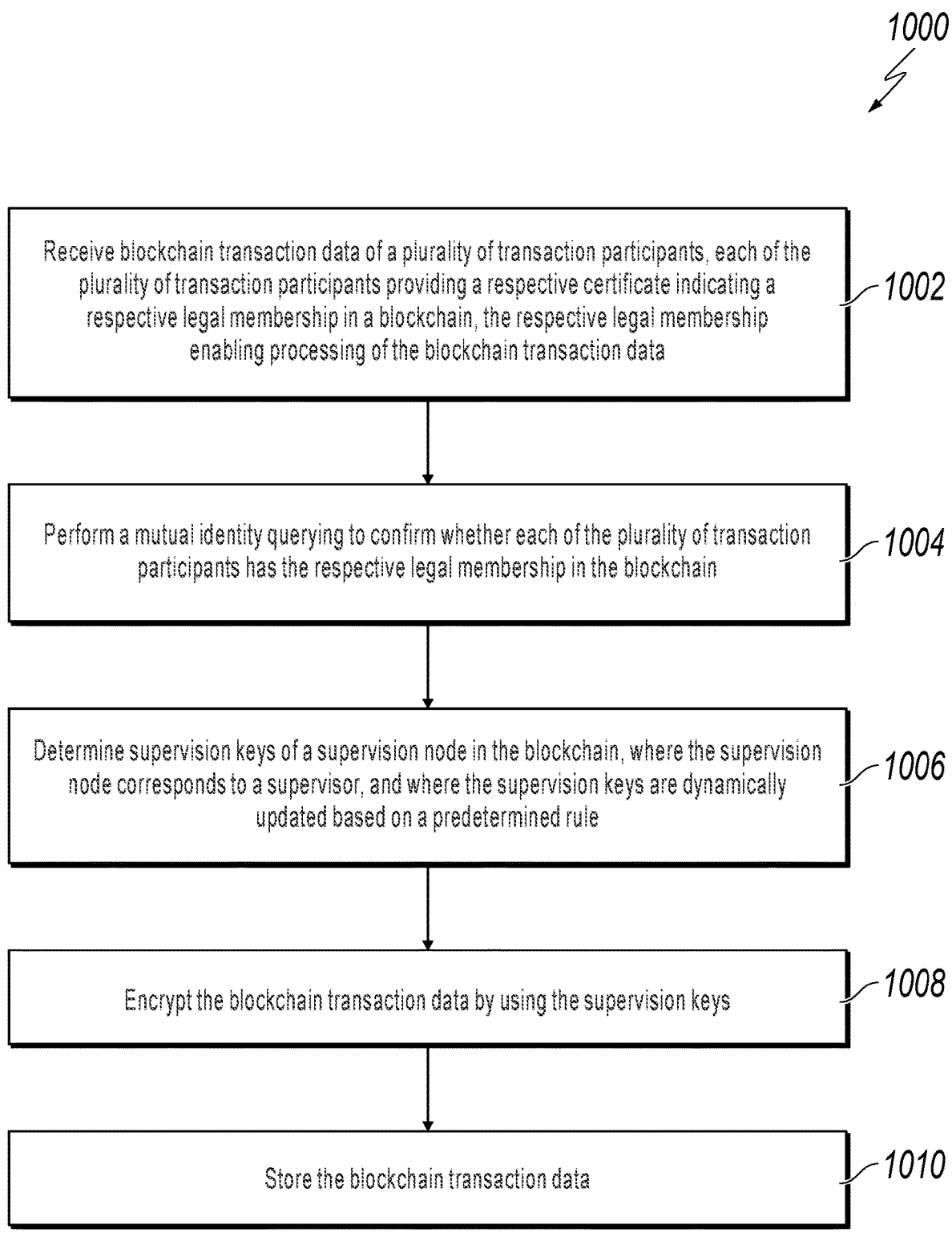
FIG. 10 is a flowchart illustrating an example of a computer-implemented method for blockchain data processing, according to an implementation of the present disclosure.

FIG. 10 is a flowchart illustrating an example of a computer-implemented method 1000 for blockchain data processing, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, blockchain transaction data of a plurality of transaction participants is received. Each of the plurality of transaction participants provides a respective certificate indicating a respective legal membership in a blockchain. The blockchain can be a consortium blockchain, for example. The respective legal membership enables processing of the blockchain transaction data. As an example, the blockchain transaction that is received can be related to a contract between contract participants A and B, as described with reference to FIG. 2. Participants A and B can be members of a consortium chain, holding respective certificates, for example. From 1002, method 1000 proceeds to 1004.

At 1004, a mutual identity querying is performed to confirm whether each of the plurality of transaction participants has the respective legal membership in the blockchain. As an example, examination of the certificates for Participants A and B can prove that Participants A and B are legal members of the blockchain and can perform processing such as contract creation and execution on the blockchain. From 1004, method 1000 proceeds to 1006.

At 1006, supervision keys of a supervision node in the blockchain are determined, where the supervision node corresponds to a supervisor, and where the supervision keys are dynamically updated based on a predetermined rule. As an example, the supervisor can be included in the plurality of transaction participants and can be determined based on an agreement of a majority of the plurality of transaction participants. The supervision keys can include a supervision public key and a supervision private key that are generated based on an asymmetric encryption algorithm. For example, the asymmetric encryption algorithm can be a Rivest-Shamir-Adleman algorithm, an Elgamal algorithm, a knapsack algorithm, a Rabin algorithm, a Diffie-Hellman key exchange algorithm, or an elliptic curve cryptographic algorithm. In some implementations, encrypting the blockchain transaction data by using the supervision keys can include encrypting transaction content by using the supervision public key. In some implementations, encrypting the blockchain transaction data by using the supervision keys can include encrypting, by using the supervision public key, a private key used by a transaction participant to sign a transaction or a temporary identity. From 1006, method 1000 proceeds to 1008.

At 1008, the blockchain transaction data is encrypted by using the supervision keys. For example, the supervision and encryption processing module 202 can encrypt the blockchain transaction data by using the supervision keys. From 1008, method 1000 proceeds to 1010.

At 1010, the blockchain transaction data is stored. As an example, the blockchain transaction data can be stored in a block of the blockchain. After 1010, method 1000 can stop.

In some implementations, method 1000 can further include steps for broadcasting and recording the new supervision public key. For example, a new supervision public key in the blockchain can be broadcast by the supervision node. A determination can be made whether the supervision public key is updated based on the new supervision public key. A locally stored supervision key can be updated to the new supervision public key. In response to determining that the supervision public key is updated, the new supervision public key can be received and recorded by a blockchain node.

In some implementations, determining the supervision keys of the supervision node in the blockchain can include receiving the new supervision public key broadcasted by the supervision node in the blockchain. For example, determining the supervision keys of the supervision node in the blockchain can include receiving the new supervision public key broadcasted by the supervision node in the blockchain and updating a locally stored supervision key to the new supervision public key.

In some implementations, determining the supervision keys of the supervision node in the blockchain can include performing signature verification. For example, the new supervision public key broadcasted by the supervision node can be received in the blockchain, where the new supervision public key includes data signed by using a non-updated supervision private key. A signature verification can be performed on the signed data by using a public key of the supervision keys that were stored and were previously updated. A determination can be made whether the signature verification succeeds. In response to determining that the signature verification succeeds, a locally-stored supervision key can be updated to the new supervision public key.

In some implementations, method 1000 can further include steps for using a supervision message. For example, a supervision message sent by the supervisor can be received. Verification can be performed on the supervision message by using the supervision public key that was stored. The supervision message can include, for example, data signed by the supervision node that is signed by using the supervision private key.

The present disclosure relates to blockchain data processing. Blockchain transaction data of a plurality of transaction participants is received, where each participant provides a respective certificate indicating a respective legal membership in a blockchain. The respective legal membership enables processing of the blockchain transaction data. A mutual identity query is preformed to confirm whether each of the plurality of transaction participants has the respective legal membership in the blockchain. Supervision keys of a supervision node in the blockchain are determined. The supervision node corresponds to a supervisor, and the supervision keys are dynamically updated based on a predetermined rule. The blockchain transaction data is encrypted by using the supervision keys and then stored. An advantage of the method and the device is that supervision keys of a supervision node are dynamically updated, and updated supervision keys are broadcasted in an entire blockchain network and are recorded by each blockchain node. The dynamically updated supervision keys can effectively improve supervision security and reliability.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second(s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for blockchain data processing, comprising:

receiving, by a first blockchain node device of a blockchain, from a supervision node device of the blockchain, a first supervision public key, wherein the first supervision public key is generated by a bank or by a regulatory institution;

locally storing, by the first blockchain node device, the first supervision public key;

obtaining, by the first blockchain node device, blockchain transaction data of a plurality of transaction participants participating in a transaction, each transaction participant of the plurality of transaction participants providing a respective certificate indicating a respective contractual membership in the blockchain, each respective contractual membership enabling processing of the blockchain transaction data by a corresponding transaction participant of the plurality of transaction participants, wherein the blockchain transaction data is distributed among blockchain nodes in the blockchain, and wherein the blockchain transaction data comprises an agreement specifying that the supervision node device, distinct from the plurality of transaction participants, has authority to supervise processing of the blockchain transaction data;

performing, by the first blockchain node device, identity querying of a first transaction participant of the plurality of transaction participants, comprising submitting the certificate of the first transaction participant to a platform of the blockchain;

receiving, by the first blockchain node device, from the supervision node device through the blockchain, a new supervision public key, wherein the new supervision public key is signed by a first supervision private key paired with the first supervision public key, and wherein the first supervision private key and the new supervision public key are generated by the bank or by the regulatory institution;

performing, by the first blockchain node device, signature verification on the new supervision public key by using the first supervision public key;

determining, by the first blockchain node device, that the signature verification has succeeded;

updating, by the first blockchain node device, the first supervision public key to the new supervision public key;

encrypting, by the first blockchain node device, the blockchain transaction data by using the new supervision public key;

storing, by the first blockchain node device, the blockchain transaction data encrypted with the new supervision public key to the blockchain; and receiving, by the first blockchain node device, from the supervision node device, a supervision message subsequent to the supervision node device placing at least one transaction participant of the plurality of transaction participants on a blacklist or subsequent to the supervision node device preventing the transaction, wherein the supervision node device is configured to perform steps comprising retrieving, by the supervision node device, from the blockchain, the blockchain transaction data encrypted with the new supervision public key;

decrypting, by the supervision node device, using a new supervision private key generated by the bank or by the regulatory institution, the blockchain transaction data encrypted with the new supervision public key, to generate decrypted blockchain transaction data, wherein the new supervision private key is generated by the supervision node device and paired with the new supervision public key;

performing, by the supervision node device, supervision processing on the decrypted blockchain transaction data, wherein performing supervision processing comprises placing the at least one transaction participant of the plurality of transaction participants on the blacklist or preventing the transaction; and initiating the supervision message.

2. The computer-implemented method of claim 1, wherein the first supervision private key and the first supervision public key are generated by the bank or by the regulatory institution using the supervision node device based on an asymmetric encryption algorithm.

3. The computer-implemented method of claim 2, wherein the asymmetric encryption algorithm comprises one of a Rivest-Shamir-Adleman algorithm, an Elgamal algorithm, a knapsack algorithm, a Rabin algorithm, a Diffie-Hellman key exchange algorithm, or an elliptic curve cryptographic algorithm.

4. The computer-implemented method of claim 1, wherein encrypting the blockchain transaction data by using the new supervision public key comprises encrypting, by using the new supervision public key, a public key of the first blockchain node device, wherein a private key of the first blockchain node device, paired with the public key of the first blockchain node device, is used by the first blockchain node device to sign the blockchain transaction data.

5. The computer-implemented method of claim 1, comprising:

verifying the supervision message using the new supervision public key.

6. A non-transitory, computer-readable medium storing one or more instructions that, when executed by a computer system of a first blockchain node device, cause the computer system to perform operations comprising:
receiving, from a supervision node device of a blockchain, a first supervision public key, wherein the first supervision public key is generated by a bank or by a regulatory institution;
locally storing, to the first blockchain node device, the first supervision public key;
obtaining blockchain transaction data of a plurality of transaction participants participating in a transaction, each transaction participant of the plurality of transaction participants providing a respective certificate indicating a respective contractual membership in the blockchain, each respective contractual membership enabling processing of the blockchain transaction data by a corresponding transaction participant of the plurality of transaction participants, wherein the blockchain transaction data is distributed among blockchain nodes in the blockchain, and
wherein the blockchain transaction data comprises an agreement specifying that the supervision node device, distinct from the plurality of transaction participants, has authority to supervise processing of the blockchain transaction data;
performing identity querying of a first transaction participant of the plurality of transaction participants, comprising submitting the certificate of the first transaction participant to a platform of the blockchain;
receiving, from the supervision node device through the blockchain, a new supervision public key, wherein the new supervision public key is signed by a first supervision private key paired with the first supervision public key, and wherein the first supervision private key and the new supervision public key are generated by the bank or by the regulatory institution;
performing signature verification on the new supervision public key by using the first supervision public key;
determining that the signature verification has succeeded;
updating the first supervision public key to the new supervision public key;
encrypting the blockchain transaction data by using the new supervision public key;
storing the blockchain transaction data encrypted with the new supervision public key to the blockchain; and
receiving from the supervision node device, a supervision message subsequent to the supervision node device placing at least one transaction participant of the plurality of transaction participants on a blacklist or subsequent to the supervision node device preventing the transaction, wherein the supervision node device is configured to perform steps comprising
retrieving, by the supervision node device, from the blockchain, the blockchain transaction data encrypted with the new supervision public key;
decrypting, by the supervision node device, using a new supervision private key generated by the bank or by the regulatory institution, the blockchain transaction data encrypted with the new supervision public key, to generate decrypted blockchain transaction data, wherein the new supervision private key is generated by the supervision node device and paired with the new supervision public key;
performing, by the supervision node device, supervision processing on the decrypted blockchain transaction data, wherein performing supervision processing comprises placing the at least one transaction participant of the plurality of transaction participants on the blacklist or preventing the transaction; and
initiating the supervision message.

7. The non-transitory, computer-readable medium of claim 6, wherein the first supervision private key and the first supervision public key are generated by the bank or by the regulatory institution using the supervision node device based on an asymmetric encryption algorithm.

8. The non-transitory, computer-readable medium of claim 7, wherein the asymmetric encryption algorithm comprises one of a Rivest-Shamir-Adleman algorithm, an Elgamal algorithm, a knapsack algorithm, a Rabin algorithm, a Diffie-Hellman key exchange algorithm, or an elliptic curve cryptographic algorithm.

9. The non-transitory, computer-readable medium of claim 6, wherein encrypting the blockchain transaction data by using the new supervision public key comprises
encrypting, by using the new supervision public key, a public key of the first blockchain node device, wherein a private key of the first blockchain node device, paired with the public key of the first blockchain node device, is used by the first blockchain node device to sign the blockchain transaction data.

10. A computer-implemented system, comprising:
one or more computers of a first blockchain node device; and
one or more computer memory devices interoperably coupled with the one or more computers and having tangible, non-transitory, machine-readable media storing one or more instructions that, when executed by the one or more computers, cause the one or more computers to perform one or more operations comprising:
receiving, from a supervision node device of a blockchain, a first supervision public key, wherein the first supervision public key is generated by a bank or by a regulatory institution;
locally storing the first supervision public key;
obtaining blockchain transaction data of a plurality of transaction participants participating in a transaction, each transaction participant of the plurality of transaction participants providing a respective certificate indicating a respective contractual membership in the blockchain, each respective contractual membership enabling processing of the blockchain transaction data by a corresponding transaction participant of the plurality of transaction participants, wherein the blockchain transaction data is distributed among blockchain nodes in the blockchain, and
wherein the blockchain transaction data comprises an agreement specifying that the supervision node device, distinct from the plurality of transaction participants, has authority to supervise processing of the blockchain transaction data;
performing identity querying of a first transaction participant of the plurality of transaction participants, comprising submitting the certificate of the first transaction participant to a platform of the blockchain;
receiving, from the supervision node device through the blockchain, a new supervision public key, wherein the new supervision public key is signed by a first supervision private key paired with the first supervision public key, and wherein the first supervision private key and the new supervision public key are generated by the bank or by the regulatory institution;

performing signature verification on the new supervision public key by using the first supervision public key;

determining that the signature verification has succeeded;

updating the first supervision public key to the new supervision public key;

encrypting the blockchain transaction data by using the new supervision public key;

storing the blockchain transaction data encrypted with the new supervision public key to the blockchain; and receiving from the supervision node device, a supervision message subsequent to the supervision node device placing at least one transaction participant of the plurality of transaction participants on a blacklist or subsequent to the supervision node device preventing the transaction, wherein the supervision node device is configured to perform steps comprising retrieving, by the supervision node device, from the blockchain, the blockchain transaction data encrypted with the new supervision public key;

decrypting, by the supervision node device, using a new supervision private key generated by the bank or by the regulatory institution, the blockchain transaction data encrypted with the new supervision public key, to generate decrypted blockchain transaction data, wherein the new supervision private key is generated by the supervision node device and paired with the new supervision public key;

performing, by the supervision node device, supervision processing on the decrypted blockchain transaction data, wherein performing supervision processing comprises placing the at least one transaction participant of the plurality of transaction participants on the blacklist or preventing the transaction; and initiating the supervision message.

11. The computer-implemented system of claim 10, wherein the first supervision private key and the first supervision public key are generated by the bank or by the regulatory institution using the supervision node device based on an asymmetric encryption algorithm.

12. The computer-implemented system of claim 11, wherein the asymmetric encryption algorithm comprises one of a Rivest-Shamir-Adleman algorithm, an Elgamal algorithm, a knapsack algorithm, a Rabin algorithm, a Diffie-Hellman key exchange algorithm, or an elliptic curve cryptographic algorithm.

13. The computer-implemented system of claim 10, wherein encrypting the blockchain transaction data by using the new supervision public key comprises encrypting, by using the new supervision public key, a public key of the first blockchain node device, wherein a private key of the first blockchain node device, paired with the public key of the first blockchain node device, is used by the first blockchain node device to sign the blockchain transaction data.

* * * * *